Sept. 10, 1946.  L. T. SACHTLEBEN  2,407,347
OBJECTIVE
Filed June 27, 1944

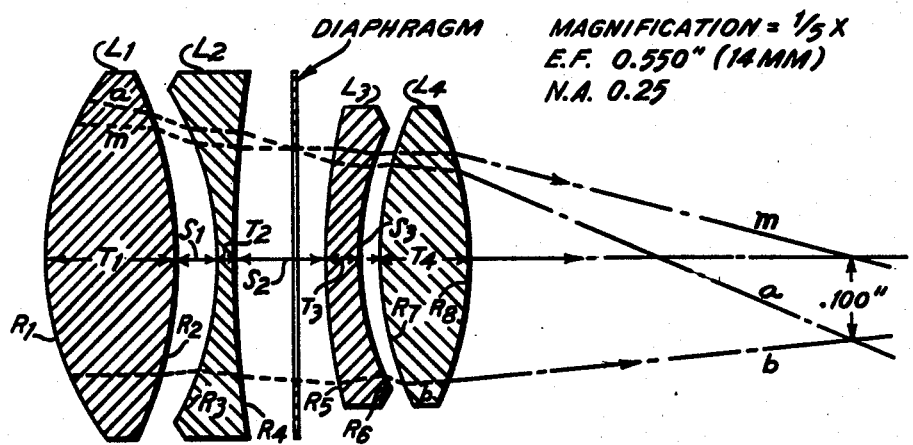

DIAPHRAGM

MAGNIFICATION = 1/5 X
E.F. 0.550" (14MM)
N.A. 0.25

| LENS | GLASS | RADII | THICKNESS & SEPARATIONS |
|---|---|---|---|
| $L_1$ | DENSE BARIUM CROWN<br>$N_D = 1.61088$<br>$N_A' = 1.60411$<br>$V = 57.2$ | $R_1 = +0.3587''$<br>$R_2 = -0.9091''$ | $T_1 = 0.1091''$ |
|  |  |  | $S_1 = 0.0303''$ |
| $L_2$ | EXTRA DENSE FLINT<br>$N_D = 1.7200$<br>$N_A' = 1.70555$<br>$V = 29.3$ | $R_3 = -0.4564''$<br>$R_4 = +10.5523''$ (CONCAVE) | $T_2 = 0.0248''$ |
|  |  |  | $S_2 = 0.0606''$ |
| $L_3$ | SAME AS<br>FOR $L_2$ | $R_5 = +0.7785''$<br>$R_6 = +0.2788''$ | $T_3 = 0.0248''$ |
|  |  |  | $S_3 = 0.0242$ |
| $L_4$ | SAME AS<br>FOR $L_1$ | $R_7 = +0.4178''$<br>$R_8 = -0.4178''$ | $T_4 = 0.1091''$ |

DIAPHRAGM DIAMETER = 0.267"     PLANE OF DIAPHRAGM TO
                                 VERTEX OF $R_5$ = 0.015

Inventor
LAWRENCE T. SACHTLEBEN

Patented Sept. 10, 1946

2,407,347

UNITED STATES PATENT OFFICE 2,407,347

OBJECTIVE

Lawrence T. Sachtleben, Indianapolis, Ind., assignor to Radio Corporation of America, a corporation of Delaware Application June 27, 1944, Serial No. 542,309

8 Claims. (Cl. 88—57)

This invention relates to an objective and, more particularly, to one adapted to be used in an optical system for reproducing sound from film.

Sound tracks having a width up to .200" are, in many respects, more desirable than tracks of the standard width of approximately .100", particularly because of the proportionate gain in light output and improved signal-to-noise ratio obtainable therewith. A substantial increase in efficiency may be obtained in a system for reproducing sound from wide-track film by increasing the working numerical aperture of the objective.

It is an object of the invention to provide an improved objective adapted for use in the reproduction of sound tracks on film having a width up to .200".

Another object of the invention is to provide an improved, highly corrected objective capable of operating satisfactorily at an effective speed of f/2.0.

A further object of the invention is to provide an improved objective which has a flat field, a working numerical aperture of 0.25 at a magnification of ⅕, and minimum focus in the orange part of the spectrum.

A further object of the invention is to provide an improved objective which is highly corrected for spherical and chromatic aberration, astigmatism, flatness of field, coma and distortion.

Another object of the invention is to provide an improved objective in which, in addition to the characteristics before mentioned, there is no vignetting over the useful field.

These objects are achieved by employing a four-lens, axially air-spaced objective wherein the two inner, negative lenses are of glass of higher index of refraction than has been customary in prior art objectives of this type, and by selecting such thicknesses for the lenses, such curvatures for the lens surfaces, and such separations between the lenses (all of which are described in detail hereinafter), as are sufficient substantially to correct the various aberrations to which the objective would otherwise be subject.

The invention may be better understood from a consideration of the following description thereof, when read in conjunction with the accompanying drawing, the single figure of which is a view in meridian section of a preferred embodiment of the invention. This view is drawn generally to a scale of approximately 6.5:1; but to make the view clearer, the curvatures, thicknesses and separations of the lenses have been somewhat exaggerated. The drawing also shows the path of a pair of tangential or meridional rays $a$ and $b$ through the margin of the full aperture of the diaphragm to the edge of the image field, as well as a corresponding marginal ray M of an axial pencil. The table which is included in the drawing gives the actual specification of said embodiment.

The objective comprises four lenses spaced from each other along the optical axis of the system. In the drawing, the light is regarded as passing from left to right, as indicated by arrows, and the lenses are numbered $L_1$ to $L_4$ in that order, the lens $L_1$ being regarded as the front lens. The thicknesses of these four lenses are indicated by the reference characters $T_1$ to $T_4$, the eight surfaces and their radii of curvature by the reference characters $R_1$ to $R_8$, and the separations between the four lenses by the reference characters $S_1$ to $S_3$, all in the same order. A diaphragm which may have a diameter of .267" is located between the two inner lenses at a distance of .015" from the vertex of surface $R_5$.

In the reproduction of sound from film, cesium photocells are ordinarily employed. Such cells are particularly sensitive to red light, and this is ordinarily derived from a tungsten lamp. One requirement of the objective, therefore, is that it should have minimum focus for light of that color. For practical reasons of design, the A' and D lines of the spectrum are united, giving minimum focus in the orange part of the spectrum. For maximum efficiency, it is also desired to maintain the effective speed of the objective at f/2.0. A further requirement is that the magnification should be ⅕ from the slit (not shown), from which the light passes to the objective to the film on which the image of the slit is formed.

To meet these requirements without undue curvature, the two inner or intermediate lenses are made of extra dense flint glass having an index of refraction of 1.72 for light of the D line of the spectrum, and of 1.70555 for light of the A' line of the spectrum. Of these two lenses, the front intermediate lens is bi-concave and the rear intermediate lens is of concave meniscus form. The two outer lenses are of dense barium crown glass, having indices of refraction of 1.61088 and 1.60411 for the D and A' lines of the spectrum, respectively. The front lens of the two outer lenses is bi-convex, and the rear lens equi-convex. It was found that departure of the rear lens from the equi-convex form increased spherical over-correction in the tangential fans at the edge of the field. This form is also of value because it is not possible in assembly to make a mistake by turning the lens the wrong way, and it therefore provides ease of assembly.

To prevent spherical undercorrection without bending the lens $L_2$ excessively, it was found necessary to reduce the spacing $S_2$ between the two inner lenses. From the data of the preferred embodiment, it will be seen that the spacing $S_2$ is .0606″ for a focal length of the objective of .550″, which is equivalent to a ratio of somewhat less than .115 times the focal length, while the radius of curvature $R_3$ of the front surface of the lens $L_2$ is .4564, which is equivalent to a ratio of more than .82 times the focal length. In this embodiment, $R_3$ is more than seven times $S_2$. An increased bending of the lens $L_2$ would have required an increase of the spacing $S_1$, but in the preferred embodiment the ratio between $S_2$ and $S_1$ was maintained at 2:1.

In the preferred embodiment, the focal length of the equi-convex lens $L_4$, as derived from the data contained in this specification and the accompanying drawing, was 0.36368″ for the A′ line of the spectrum, for which the objective was originally designed. As before stated, the focal length of the objective as a whole, in the preferred embodiment, was 0.550″, giving a ratio of the focal length of $L_4$ to that of the objective as a whole of .66124. In general, this ratio should be more than .5 and less than .75″.

It was found that coma and field curvature responded to bending of lenses $L_1$ and $L_3$ more than to any other changes in the system, and the flattest field consistent with removal of coma at the margin of the field was obtained when the radii $R_1$ and $R_2$ were approximately in the ratio 2:5, and the radii $R_5$ and $R_6$ were approximately in the ratio 14:5. Chromatic correction was established for each crown and flint pair separately, as this practice tends to hold transverse or lateral color aberration to a minimum.

With the objective constructed as here described, it was found that there was no vignetting up to an angular semi-field of 8° 39′, measured from the second principal point. The field was strongly flattened, astigmatism was slightly overcorrected, and spherical aberration slightly undercorrected.

There has thus been described a highly corrected objective particularly adapted for use in the reproduction of sound from wide-track film. The objective has a flat field, a working numerical aperture of 0.25 at a magnification of ⅕, and minimum focus in the region of the C line of the spectrum with no vignetting over the useful field.

I claim as my invention:

1. A four-lens, axially air-spaced objective comprising in order from front to rear in the direction of incident light, a bi-convex lens, a bi-concave lens, a meniscus concave lens and an equi-convex lens, the outer lenses being of equal thickness and of the same dense barium crown glass having an index of refraction of less than 1.7, and the inner lenses being of equal thickness and of the same dense flint glass having an index of refraction of greater than 1.7, the axial separation between the two inner lenses being double the axial separation between the two front lenses, the surface of said bi-concave lens having the shorter radius of curvature and the surface of said meniscus concave lens having the greater radius of curvature being disposed towards the incident light, and the focal length of said equi-convex lens being more than one-half and less than three-fourths of the focal length of the objective as a whole.

2. A four-lens, axially air-spaced objective comprising in order from front to rear in the direction of incident light, a bi-convex lens, a bi-concave lens, a meniscus concave lens and an equi-convex lens, the outer lenses being of equal thickness and of the same dense barium crown glass having an index of refraction of less than 1.7, and the inner lenses being of equal thickness and of the same dense flint glass having an index of refraction of greater than 1.7, the axial separation between the two inner lenses being less than .115 times the focal length of the objective, the surface of said bi-concave lens having the shorter radius of curvature and the surface of said meniscus concave lens having the greater radius of curvature being disposed towards the incident light.

3. A four-lens, axially air-spaced objective comprising in order from front to rear in the direction of incident light, a bi-convex lens, a bi-concave lens, a meniscus concave lens and an equi-convex lens, the outer lenses being of equal thickness and of the same dense barium crown glass having an index of refraction of less than 1.7, and the inner lenses being of equal thickness and of the same dense flint glass having an index of refraction of greater than 1.7, the radius of curvature of the front surface of the bi-concave lens being greater than .82 times the focal length of the objective, the surface of said bi-concave lens having the shorter radius of curvature and the surface of said meniscus concave lens having the greater radius of curvature being disposed towards the incident light.

4. A four-lens, axially air-spaced objective comprising in order from front to rear in the direction of incident light, a bi-convex lens, a bi-concave lens, a meniscus concave lens and an equi-convex lens, said meniscus lens having its concave surface facing said equi-convex lens, the outer lenses being of equal thickness and of the same dense barium crown glass having an index of refraction of less than 1.7, and the inner lenses being of equal thickness and of the same dense flint glass having an index of refraction of greater than 1.7, the radius of curvature of the front surface of the bi-concave lens being at least seven times as great as the axial separation between the two inner lenses, said radius of curvature also being greater than .82 times the focal length of the objective, the surface of said bi-concave lens having the shorter radius of curvature and the surface of said meniscus concave lens having the greater radius of curvature being disposed towards the incident light.

5. A four-lens, axially air-spaced objective comprising in order from front to rear in the direction of incident light, a bi-convex lens, a bi-concave lens, a meniscus concave lens and an equi-convex lens, said meniscus lens having its concave surface facing said equi-convex lens, the outer lenses being of equal thickness and of the same dense barium crown glass having an index of refraction of less than 1.7, and the inner lenses being of equal thickness and of the same dense flint glass having an index of refraction of greater than 1.7, the ratio of the radii of curvature of the front and rear surfaces of said bi-convex lens being of the order of 2:5, the axial separation between the two inner lenses being less than .115 times the focal length of the objective, the surface of said bi-concave lens having the shorter radius of curvature and the surface of said meniscus concave lens having the greater radius of curvature being disposed towards the incident light.

6. A four-lens, axially air-spaced objective comprising in order from front to rear in the direction of incident light, a bi-convex lens, a bi-concave lens, a meniscus concave lens and an equi-convex lens, said meniscus lens having its concave surface facing said equi-convex lens, the outer lenses being of equal thickness and of the same dense barium crown glass having an index of refraction of less than 1.7, and the inner lenses being of equal thickness and of the same dense flint glass having an index of refraction of greater than 1.7, the ratio of the radii of curvature of the front and rear surfaces of the meniscus concave lens being of the order of 14:5, the focal length of said equi-convex lens being more than one-half and less than three-fourths of the focal length of the objective as a whole, the surface of said bi-concave lens having the shorter radius of curvature and the surface of said meniscus concave lens having the greater radius of curvature being disposed towards the incident light.

7. A four-lens, axially air-spaced objective comprising in order from front to rear in the direction of incident light, a bi-convex lens, a bi-concave lens, a meniscus concave lens and an equi-convex lens, the outer lenses being of equal thickness and of the same dense barium crown glass having an index of refraction of less than 1.7, and the inner lenses being of equal thickness and of the same dense flint glass having an index of refraction of greater than 1.7, the difference between the radii of curvature of the front and rear surfaces of said bi-concave lens being less than twenty times the focal length of the objective, the surface of said bi-concave lens having the shorter radius of curvature and the surface of said meniscus concave lens having the greater radius of curvature being disposed towards the incident light.

8. A four-lens, axially air-spaced objective comprising in order from front to rear in the direction of incident light, a bi-convex lens, a bi-concave lens, a meniscus concave lens and an equi-convex lens, each of the outer lenses having a thickness of approximately .2 and being of the same dense barium crown glass having an index of refraction of less than 1.7 each, of the inner lenses having a thickness of approximately .045 and being of the same dense flint glass having an index of refraction of greater than 1.7, the axial separation between said lenses in said order being, respectively, .055, .110 and .044, all dimensions being calculated in decimals of the focal length of the objective.

LAWRENCE T. SACHTLEBEN.